United States Patent [19]

House

[11] Patent Number: 5,230,305
[45] Date of Patent: Jul. 27, 1993

[54] SCOOPABLE CAT LITTER AND METHOD

[75] Inventor: Roy F. House, Houston, Tex.

[73] Assignee: Venture Innovations, Inc., Lafayette, La.

[21] Appl. No.: 980,362

[22] Filed: Nov. 23, 1992

[51] Int. Cl.$^5$ .............................................. A01K 1/015
[52] U.S. Cl. .................................................. 119/171
[58] Field of Search ................. 119/171, 172; 502/401

[56] References Cited

U.S. PATENT DOCUMENTS

| | | | |
|---|---|---|---|
| 4,206,718 | 6/1980 | Brewer | 119/171 |
| 4,217,858 | 8/1980 | Dantoni | 119/171 |
| 4,258,660 | 3/1981 | Pris et al. | 119/171 |
| 4,685,420 | 8/1987 | Stuart | 119/171 X |
| 5,014,650 | 5/1991 | Sowle et al. | 119/171 |

Primary Examiner—Robert P. Swiatek

[57] ABSTRACT

An improvement in the use of clumping, scoopable litter to sorb and remove the urine deposited in litter receptacles by utilizing as the litter a natural product which has been modified to render it cohesive when wetted with urine. The modified natural product has excellent cohesion, is biodegradable, and is completely non-dusting. The modified natural product is a farinaceous material having a bulk density in the range from about 500 kg/m$^3$ to about 900 kg/m$^3$, a reducing sugar content from about 0.5% to about 4.0%, and a cold water solubles content from about 40% to about 90%. The preferred particle size of the modified natural product is such that at least 75% of the particles thereof are from about 250 microns to about 2000 microns.

15 Claims, No Drawings

SCOOPABLE CAT LITTER AND METHOD

FIELD OF THE INVENTION

The invention pertains to a method of deodorizing animal wastes, and more particularly the excreta from pets, such as cats.

BACKGROUND OF THE INVENTION

Heretofore, many efforts have been made to develop an effective and inexpensive litter for animals, especially household pets, particularly cats. Thus it has been disclosed in various patents to use alone or in various combinations urine sorptive materials, odor-inhibiting or control chemicals or materials, antioxidants, microbial inhibitors, surfactants, dyes, antistatic agents, flame retardants, binders, encapsulants, neutralizing agents, weighting or density control agents, and other materials.

Starches, modified starches, and starch-containing materials have been disclosed for use as binders in animal litter products. Brewer U.S. Pat. No. 3,921,581 indicates that pregelatinized starches can function as a binder and water-sensitive disintegrant in a solid excipient containing a solid carrier, i.e., finely subdivided cellulosic solids or minerals, and that the pregelatinized starches do not impart any adhesiveness to the powder residue after disintegration of the particles. Fry et al. U.S. Pat. No. 3,923,005 discloses an animal litter wherein dried alfalfa is admixed with a starch-containing material, and the admixture is treated by a conventional extrusion cooking process to yield an expanded low density pelletized product. This patent indicates that the gelatinized starch binder gives the pellets an improved stability when wet, and substantially prevents structural decomposition of the finished product on contact with liquid animal wastes. The product pellets are substantially free from clumping when wet and absorb without physical expansion. Brewer U.S. Pat. No. 4,206,718 discloses a mixture of ground alfalfa with a gelatinizable carbohydrate such as flour in the weight ratio of 75:25 to 25:75 which is heated under steam pressure to gelatinize the carbohydrates and bind the particles together. Thereafter the bound together particles are expanded and then pelletized and dried. Ducharme et al. U.S. Pat. No. 4,727,824 provides absorbent compositions comprising a major amount of a cellulosic hull material, alone or in admixture with a cellulosic plant pulp, and a minor amount (generally 2-25%) of a carbohydrate or protein binder. The carbohydrate binder can be any ground or refined plant product such as a flour or starch from plant sources. Brewer U.S. Pat. No. 3,789,797 discloses the use of modified starches as a binder in the preparation of litter pellets containing alfalfa and bentonite. Carlberg U.S. Pat. No. 4,157,696 discloses the use of starch as a pelletizing aid in a liquid absorbent. Pris et al. U.S. Pat. No. 4,258,660 discloses the use of corn starch as a binder in a litter composition. Litzinger U.S. Pat. No. 4,311,115 discloses the use of starch as a binder in a liquid absorbing composition. Kok U.S. Pat. No. 4,374,794 discloses the use of starch as a binder to obtain pellets having a good firmness and dimensional stability. Harke et al. U.S. Pat. No. 4,560,527 discloses a cat litter comprising agglomerated cellulosic particles in which starch may be present as a binder. Crampton et al. U.S. Pat. No. 4,591,581 discloses absorbent clay mineral particles containing 0.2% to 5% by weight of a water dispersible colloid, which may be starch. Lojek et al. U.S. Pat. No. 4,676,196 discloses the use of 1-3% of a starch binder in a dried agglomerated absorbent material.

Fisher U.S. Pat. No. 3,916,831 discloses the use of popped popcorn as an animal litter.

In the last 10 years or so there has developed a new type of cat litter which "captures" the urine in a "ball" or "clump" of litter which can be scooped from the nonwetted litter for easy removal. These so-called "clumping" or "scoopable" litters have been based on one or more clays. Although these clumping litters have been vast improvement in eliminating the waste before it generates obnoxious odors, these clumping litters still possess one or more undesirable properties or characteristics. These include: high bulk density; poor clumping (poor cohesiveness of the wetted litter); dustiness; excessive wicking or sorption of the urine into the bulk of the litter before the wetted ball of litter is removed; friability of the clump of litter if it is not removed while substantially wet; and nonbiodegradability of the litter. Certain of the scoopable litters are said to be flushable down a commode provided that it does not empty into a septic tank. However, although the clump of litter breaks up upon placement in the commode, the litter contains clays and other minerals which are not dispersed and thus which may settle out within the conduit carrying the waste from the commode. This may result in blockage of the conduit, and can be especially troublesome in places having a high animal concentration, such as apartment complexes and the like. The following U.S. patents all disclose various clumping or scoopable cat litters: U.S. Pat. Nos. 4,685,420 (Stuart); 5,000,115 (Hughes); 5,014,650 (Sowle et al.); 5,058,533 (Nelson); 5,094,189 (Aylen).

Thus there is still a need for a superior litter which eliminates the odors associated with animal waste, and particularly for such a litter which is dust free and biodegradable such that it can be flushed into any waste system, including those which empty into septic tanks.

It is an object of this invention to provide a dust free, biodegradable clumping sorbent having sufficient cohesiveness when wetted with an aqueous liquid, such as urine, to be easily separated from the nonwetted sorbent particles, the sorbent being a modified natural product having a bulk density in the range from about 500 kg/m$^3$ to about 900 kg/m$^3$, a reducing sugar content from about 0.5 to about 4% by weight, a cold water solubles content from about 40% to about 90% by weight, and a particle size distribution such that at least 75% of the particles thereof are from about 250 microns to about 2000 microns.

It is another object of this invention to provide an improved method for agglomerating urine to facilitate removal of the urine from a litter box, wherein the urine contacts a litter sorbent which is cohesive when wetted and which agglomerates the urine into a lump of wetted litter, the improved method comprising using as the litter a modified natural product having a bulk density in the range from about 500 kg/m$^3$ to about 900 kg/m$^3$, a reducing sugar content from about 0.5 to about 4% by weight, and a cold water solubles content from about 40% to about 90% by weight.

These and other objects of the invention will be readily apparent to one skilled in the art as the description thereof proceeds.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

The method of the present invention which provides a process for the sorption and removal of urine from a cat litter box is an improvement over the methods disclosed in U.S. Pat. Nos. 4,685,420, 5,000,115, 5,214,650, and 5,094,189, each incorporated herein by reference, in that the cat litter or sorbent is a biodegradable, modified natural product having specific characteristics which can be flushed or placed into any disposal system.

As used herein, the term "natural product" refers to farinaceous materials in general which are obtained from plant sources, such as seeds, tubers, and roots. The preferred natural products for use in the present invention are seeds or grain including cereal grains such as sorghum (milo), wheat, barley, rice, oats, rye, triticale, millet, and corn, and other grains for which the term cereal grains is generic. As used herein, the term "raw grain" means grain which has not been chemically or physically treated, other than the possible removal of the floral envelopes or chaffy parts of the seed grains. The floral envelopes or chaffy parts within which the seed grains develop persist to maturity in the grass family. If the chaffy structures envelope the seed grains (caryopsis) so closely that they remain attached to it when the grain is threshed (as in rice and most varieties of oats and barley), the grain is considered to be covered. However, if the seed grains readily separate from the floral envelopes when the grain is threshed (as with common wheats, rye, hull-less barleys, and the common varieties of corn), these grains are considered to be naked. Thus covered or naked cereal grains which have not been processed further than removal of the chaffy part of the grain are considered "raw grain."

Other natural products which may be modified to produce the cohesive litter for use in the present invention include cassava roots, manioc roots, arrowroots, potatoes, sweet potatoes, and the like.

The natural product is modified to render the particles thereof cohesive when wetted with an aqueous liquid such as urine. Thus the natural product is processed such that the modified natural product has a bulk density in the range from about 500 kg/m$^3$ to about 900 kg/m$^3$, a reducing sugar content from about 0.5% to about 4.0%, and a cold water soluble content from about 40% to about 90%. Preferably the modified natural product has a particle size such that at least about 75% of the particles thereof are from about 250 microns to about 2000 microns. Most preferably at least about 85% of the particles of the modified natural product have a particle size from about 250 microns to about 2000 microns.

The natural product may be modified by any process which provides the modified natural product (sometimes hereinafter referred to as "MNP") with a bulk density in the range from about 500 kg/m$^3$ to about 900 kg/m$^3$, a reducing sugar content from about 0.5% to about 4.0%, and a cold water solubles content from about 40% to about 90%. Preferably the MNP will have a bulk density in the range from about 600 kg/m$^3$ to about 850 kg/m$^3$, a reducing sugar content from about 0.9% to about 4.0%, and a cold water solubles content from about 50% to about 85%.

A preferred process for modifying the natural product is to impregnate the natural product at sub-atmospheric pressure with a gas and thereafter subjecting the natural product under temperature and pressure conditions sufficient to produce the desired bulk density, cold water solubles content, and reducing sugar content. Thereafter the MNP is dried, if necessary, ground, and preferably sized to produce the desired particle size or particle size distribution. Exemplary of this process are the processes set forth in Barham U.S. Pat. No. 3,725,081 and Barham et al. U.S. Pat. No. 3,911,147, both incorporated herein by reference.

The terms "impregnate" or "impregnating" are used herein to means the incorporation of a fluid into the tissue structure of the natural product, as by adsorption or absorption.

The processes set forth in Barham U.S. Pat. No. 3,725,081 and Barham U.S. Pat. No. 3,911,147 are particularly applicable when the natural product is a cereal grain, particularly a raw grain. As set forth in U.S. Pat. No. 3,911,147, the step of impregnating the natural product with the gas is optional as the MNP may be prepared by subjecting the natural product to the temperatures and pressures disclosed therein, i.e., steam pressure from about 150 p.s.i. to about 300 p.s.i. When a raw grain is used as the natural product, the grain does not burst in this process and a low bulk density product is not obtained (as would be the case in an extrusion process).

The preferred gas for use in modifying the natural product is selected from the group consisting of sulfur dioxide, hydrogen chloride, ammonia, chlorine, ethylene oxide, propylene oxide, and mixtures thereof, most preferably sulfur dioxide. The gas may actually be a liquid at ambient temperature and pressure, or at the temperature and pressure at which it is stored; however, it is vaporized to a gas as the subatmospheric pressure operative during its impregnation of the natural product.

The preferred natural products are cereal grains selected from the group consisting of sorghum, wheat, barley, rice, oats, rye, triticale, millet, and corn. The preferred cereal grains are selected from the group consisting of sorghum, wheat, barley, rice, oats, and mixtures thereof. The particularly most preferred natural product is raw grain sorghum.

Another process which may be utilized to modify the natural product is set forth in Wimmer et al. U.S. Pat. No. 2,894,859, incorporated herein by reference. In this process, pregelatinized starch is treated with sufficient mineral acid to give a 10% test suspension of the starch in water a pH value in the range of 3.5 to 2.0; the acidified starch is heated to a temperature in the range from about 70° F. to 250° F. for a period of time sufficient to give the MNP (modified pregelatinized starch) the desired bulk density, reducing sugar content, and cold water solubles content.

In the Wimmer et al. process disclosed in U.S. Pat. No. 2,894,859, the pregelatinized starch may be any pregelatinized farinaceous natural product. Processes for the gelatinization of starch and farinaceous flours are well known. Representative gelatinization processes for farinaceous natural products are set forth in Protzman et al. U.S. Pat. No. 3,137,592 and Stearns et al. U.S. Pat. No. 3,256,115, both incorporated herein by reference.

The bulk density required for the MNP is obtained as a result of the processing of the natural product, and not as a result of the addition of any material to the MNP.

Methods are known for determining the reducing sugar content and cold water solubles content of carbohydrates. Thus the "Standard Analytical Methods of the Member Companies of Corn Refiners Association, Inc.", 6th edition, provides methods for determining the cold water solubles content in Standards B-56 and D-56. Methods for determining the reducing sugar content are given in Standards D-52 and F-48. Methods of reducing sugar determination are set forth in several volumes of "METHODS IN CARBOHYDRATE CHEMISTRY", Roy L. Whistler, ed. (Academic Press), as follows: Vol. I, pp. 380–390 (1962); Vol. III, p. 141 (1963); Vol. IV, pp. 64–71. "CARBOHYDRATE ANALYSIS, A PRACTICAL APPROACH", M. F. Chaplin and J. F. Kennedy, eds. (1986), sets forth a method of determining the reducing sugar assay at pp. 38-39.

In practice, when an animal urinates on the litter box sorbent comprising the MNP, the urine is sorbed by the MNP to form an agglomerated mass or lump of the MNP and urine. This lump has sufficient cohesiveness to be removed from the litter box, as by scooping, using the implements and methods normally used to remove feces from a litter box.

The MNP is an excellent urine sorbent exhibiting excellent cohesiveness when wetted. It is biodegradable in contrast to the prior art scoopable, clumping litters based on clays. The MNP is completely dust free. This is another advantage not possessed by the prior art clay based litters.

The rate of sorption of urine by the MNP is dependent upon the particular natural product and process used to prepare the MNP. Thus if a raw grain is used to prepare the MNP, the MNP will contain the oils naturally associated with the grain. These oils may decrease the rate of sorption of urine by the MNP. The rate of urine sorption can be increased by (1) adding a wettability enhancing agent to the MNP, (2) adjusting the particle size distribution of the MNP, and (3) both (1) and (2).

The term "wettability increasing agent" as used herein may be any material which increases the rate of sorption of an aqueous liquid, such as urine, by the MNP. The wettability increasing agent (hereinafter sometimes referred to as "WIA") may be a surface active agent which is sprayed onto the surface of the MNP particles. Preferably the WIA is a particulate material which is either present on the surface of the MNP or in the interstitial space between the MNP particles. If the WIA is a particulate material which is not biodegradable, then its concentration should be minimized, preferably less than about 5% by weight of the combined MNP plus WIA, such as from 0.1% to about 5%. Nonbiodegradable particulate WIA include silicas (preferably precipitated or fumed), aluminas, carbonates, bicarbonates, borates, alumino-silicates, calcium silicates, zeolites, gypsum, and the like, whether naturally occurring or manufactured, or mixtures thereof. Biodegradable particulate WIA include cellulose-containing materials, such as paper, vegetable-based by-products (including but not restricted to oat hulls, rice hulls, beet pulp, citrus pulp, bagasse, peanut hulls, corn cobs, cotton burrs, and the like), grasses (including but not limited to straw, timothy, alfalfa, and the like), lignocelluloses, and mixtures thereof. Biodegradable WIA may be used at concentrations less than about 25% by weight of the combined MNP plus WIA, such as from 0.1% to less than about 25%. If a particulate WIA is added to produce the clumping litter sorbent, it is preferred that the WIA and the MNP be dry blended. If the WIA is primarily present on the surface of the WIA, then its particle size should be less than about 150 microns, preferably less than about 75 microns, most preferably less than about 45 microns. When the WIA primarily fills the interstitial space between the MNP particles, the particle size should be such that the particles will not be unduly separated from the MNP particles in shipping and handling.

The rate of urine sorption by the MNP can also be increased by changing the particle size distribution of the MNP particles. Thus it has been determined that the preferred particle size range of the MNP is from about 250 microns to about 2000 microns. Preferably at least 75% of the particles of the MNP are within this range, most preferably at least 85%. The larger the particle size, the larger will be the void space or pores between the particles, and hence as the particle size increases the rate of sorption of urine by the MNP increases. Thus the particle size distribution can be adjusted to give the MNP the desired rate of urine sorption.

Conversely, as the particle size increases, in generally the sorption capacity (or amount of urine sorbed per unit weight of litter) decreases since the urine contacts more particles before it is completely sorbed. Thus it is preferable to provide the MNP with a particle size such that at least 75% of the particles thereof are in the range from about 250 microns to about 2000 microns (most preferably from about 297 microns to about 2000 microns) and to mix with the MNP a wettability increasing agent in an amount from about 0.1% to less than about 25% based on the combined weight of the MNP and the wettability increasing agent.

In order to more completely describe the invention, the following non-limiting examples are given. In these examples and throughout this specification, the following abbreviations may be used: BD=compacted bulk density; SC=water sorption capacity; cc=cubic centimeter(s); g=gram(s); kg=kilogram(s); m=meter(s); lbm=pound.

All mesh sizes used in the description of the invention are in terms of U.S. Standard Sieve Series, Fine Series of 1940, i.e., 10 mesh=2000 microns sieve openings, 50 mesh=297 microns, 60 mesh=250 microns, 100 mesh=149 microns. A particle size designated +X indicates the particles were retained on a sieve of size X mesh. A particle size of Y/Z indicates that the particles passed through a sieve of mesh size Y and were retained on a sieve of mesh size Z. A particle size designated −W indicates that the particles all passed through a sieve of mesh size W. All percentages throughout this specification and claims are weight percent.

The particle size of the materials was determined using the following procedure: A series of sieves of varying mesh sizes with openings diminishing in size from the top downward were stacked over a solid bottom pan. The materials were placed on a vibrating shaker and shaken for 10 minutes. The weight of material retained on each sieve and in the pan was determined and the % by weight of sample calculated.

Methods are known to measure the compacted bulk density of solids. In these examples, the material was weighted into a 100 cc graduate cylinder, compacted by tapping to constant volume, and measuring the volume of the compacted solids. The apparent sorption capacity for the purposes of describing this invention, is measured using the following procedure: a measured quantity of the sorbent is weighed into a preweighed or tared plastic weighing dish, generally 30.0 grams of sample; distilled water is added dropwise slowly until 4.0 grams (cc) has been added; this is aged five (5) minutes to allow for sorption and spreading of the water; thereinafter the weight of the sample not wet by the water is determined by carefully pouring off the dry sample from the wetted sample; the sorption capacity in cc/g is calculated using the equation $$SC = \frac{4.0}{30.0 - (\text{g of non-wetted sample})} \text{ cc/g}$$

During the sorption capacity testing, the cohesiveness of the wetted lump or mass of sample is observed. If the wetted lump is firm and can be removed from the non-wetted sample intact, it is given an excellent (E) rating. If the surface of the wetted lump is somewhat friable such that some particles remain with the non-wetted sample while the remainder of the wetted lump is removed intact, it is given a fair (F) rating. If the wetted sample breaks apart when removed from the non-wetted sample, it is given a poor (P) rating. Also during the sorption capacity testing, the wettability (i.e., the ease or rate of sorption of the water into the sample) is observed. If the water is sorbed (disappears) within 20 seconds, it is given a rating of good (G). If the water is sorbed within 30 seconds, it is given a rating of fair (F). If the water is sorbed in excess of 30 seconds, it is given a rating of poor (P).

EXAMPLE A 3632 kg of whole raw grain sorghum containing 10.5% moisture was placed in a reaction chamber, hermetically sealed, and subjected to a vacuum of about 25 inches of Hg. After equilibrium conditions were established, 16.25 kg of sulfur dioxide were flashed into the nearly filled chamber increasing the pressure to atmospheric. The grain was aged in the chamber for one hour after adding the sulfur dioxide, at ambient temperature, during which the original vacuum was obtained, then the vacuum was released. About 900 kg of the treated sorghum was transferred to an autoclave which was then hermetically sealed. High pressure steam was admitted to the autoclave at such a rate that a peak pressure of 180 p.s.i.g. to 200 p.s.i.g. was attained in 2.5 minutes. This pressure was maintained for an additional one minute, and then the autoclave was opened and brought to atmospheric pressure. The modified whole grain sorghum was removed from the autoclave, dried to about 10% moisture, and ground through a hammer mill. The remainder of the treated grain was similarly autoclaved and processed. This MNP had a reducing sugar content, expressed on the basis of glucose, of about 0.75% and a cold water solubles content of about 65%.

Samples were prepared for cat litter sorbents as follows. Sample 1 was prepared by screening the modified whole grain sorghum (hereinafter "MWS") and retaining the 10/30 fraction. Sample 2 was prepared by screening the MWS and retaining the 10/60 fraction. Sample 3 was prepared by screening the MWS and retaining the 20/60 fraction. Sample 4 was prepared by combining various fractions as indicated in Table I. Sample 5 was prepared by mixing Sample 1 with 1% by weight of FLO-GARD AG130 synthetic precipitated silica. Sample 6 was prepared by mixing Sample 2 with 1% by weight of FLO-GARD AG130. Sample 7 was prepared by mixing Sample 4 with 1% by weight FLO-GARD AG130. Samples 8, 9, 10, 11, and 12 were prepared by mixing together various fractions which had been treated with 1% FLO-GARD AG130.

These samples were evaluated for their particle size distribution, bulk density, sorption capacity, cohesiveness, and wettability. All of the samples were characterized with excellent cohesiveness. The data obtained are given in Table 1. The data indicate that the amorphous precipitated silica provided acceptable wettability to the samples.

TABLE I

| Sample | Particle Size Distribution, % | | | | | | Bulk Density $kg/m^3$ | Sorption Capacity cc/g | Wettability |
|---|---|---|---|---|---|---|---|---|---|
| | 10/20 | 20/30 | 30/40 | 40/50 | 50/60 | −60 | | | |
| 1 | 29.7 | 64.85 | 5.1 | 0.35 | 0 | 0 | 720 | 0.61 | F |
| 2 | 10.1 | 29.5 | 25.5 | 19.45 | 7.75 | 7.75 | 756 | 0.68 | P |
| 3 | 0.2 | 21.2 | 31.3 | 25.7 | 15.2 | 6.4 | — | 0.75 | P |
| 4 | 24.85 | 54.3 | 20.85 | 0 | 0 | 0 | — | 0.61 | F |
| 5 | 28.7 | 64.5 | 5.2 | 0.15 | 0.15 | 1.3 | 701 | 0.54 | G |
| 6 | 11.3 | 27.2 | 22.45 | 17.8 | 7.95 | 13.3 | 742 | 0.78 | G |
| 7 | 26.0 | 52.0 | 8.8 | 6.2 | 1.7 | 5.3 | — | 0.53 | G |
| 8 | 25 | 40 | 25 | 10 | 0 | 0 | 695 | 0.65 | G |
| 9 | 18.5 | 41.6 | 22.7 | 16.2 | 0.1 | 0.8 | 719 | 0.60 | G |
| 10 | 15.5 | 34.9 | 27.1 | 21.7 | 0.1 | 0.7 | 713 | 0.67 | G |
| 11 | 16.0 | 34.0 | 27.0 | 22.3 | 0 | 0 | 694 | 0.71 | G |
| 12 | 11.7 | 28.1 | 20.7 | 36.3 | 2.3 | 0.9 | — | 0.67 | G |

EXAMPLE B

Whole grain sorghum was modified by the procedures of Example A except that 3632 kg of raw grain containing 12% moisture was treated with 16.0 kg of sulfur dioxide.

This modified sorghum was screened (sieved) and the 10/40 fraction retained. It had a bulk density of 707 $kg/m^3$ and a particle size distribution as follows: 10/20=13.0%; 20/30=23.7%; 30/40=38.4%; 40/50=14.7%; 50/60=0.4%; −60=0.7%. Samples were then obtained by mixing portions of this modified sorghum with various materials as indicated in Table II. The samples were evaluated for sorption capacity, cohesiveness, and wettability. The data obtained are given in Table II. All of the samples had excellent cohesiveness.

TABLE II

| Sample | Material | Sorption Capacity cc/g | Wettability |
|---|---|---|---|
| 13 | None | 0.68 | F |
| 14 | 1% ZEOTHIX 265 synthetic silica | 0.67 | G |
| 15 | 1% HI-SIL T600 synthetic precipitated silica | 0.64 | G |
| 16 | 2% SOLKA FLOC cellulose | 0.71 | G |
| 17 | 3.5% MASONEX dried wood molasses | 0.62 | G |
| 18 | 2% MIN-U-GEL FG attapulgite + 1% FLO-GARD AB | 0.95 | G |
| 19 | 1% FLO-GARD AB synthetic silica | 0.87 | G |
| 20 | 1% EXBOR H puffed borax | 0.75 | G |
| 21 | 24% 30/80 rice hulls | 1.02 | G |
| 22 | 24% 30/80 rice hulls + 1% FLO-GARD AB | 0.93 | G |
| 23 | 24% L/M Mini-Corn Cob ground corn cobs | 0.64 | G |

The animal litter can comprise additional ingredients if desired, such as perfumes, deodorants, odor absorbents, antimicrobial agents, disinfectants, colorants, pesticides, and the like.

What is claimed is:

1. In a process for agglomerating urine to facilitate removal of the urine from a litter box wherein the urine contacts a litter which is cohesive when wetted and which agglomerates the urine into a lump of wetted litter, the improvement which comprises using as the litter a modified natural product having a bulk density in the range from about 500 kg/m$^3$ to about 900 kg/m$^3$, a reducing sugar content from about 0.5% to about 4.0% by weight, and a cold water solubles content from about 40% to about 90% by weight.

2. The process of claim 1 wherein the modified natural product has a particle size such that at least 75% of the particles thereof are from about 250 microns to about 2000 microns.

3. The process of claim 1 wherein the natural product has been modified by impregnating the natural product at subatmospheric pressure with a gas and thereafter subjecting the natural product under temperatures and pressure conditions sufficient to produce the required bulk density, reducing sugar content, and cold water solubles content.

4. The process of claim 3 wherein the gas is selected from the group consisting of sulfur dioxide, hydrogen chloride, ammonia, chlorine, ethylene oxide, propylene oxide, and mixtures thereof.

5. The process of claim 3 wherein the gas is sulfur dioxide.

6. The process of claim 1, 2, 3, 4, or 5 wherein the natural product is a raw grain or mixture of raw grains.

7. The process of claim 1, 2, 3, 4, or 5 wherein the natural product is raw grain sorghum.

8. In a process for agglomerating urine to facilitate removal of the urine which has been deposited in a litter-containing receptacle wherein the urine contact a litter which is cohesive when wetted and which agglomerates the urine into a lump of wetted litter, the improvement which comprises using as the litter a modified natural product having a bulk density in the rage from about 500 kg/m$^3$ to about 900 kg/m$^3$, a reducing sugar content from about 0.5% to about 4.0% by weight, a cold water soluble content from about 40% to about 90% by weight, and a particle size such that at least 75% of the particles thereof are from 250 microns to about 2000 microns, wherein the modified natural product has mixed therewith from about 0.1% to less than about 25% of a particulate wettability increasing agent.

9. The process of claim 8 wherein the particulate wettability increasing agent is biodegradable.

10. The process of claim 8 wherein the modified natural product has mixed therewith from about 0.1% to about 5% of a particulate non-biodegradable wettability increasing agent.

11. A sorbent comprising a modified natural product having a bulk density in the range from about 500 kg/m$^3$ to about 900 kg/m$^3$, a reducing sugar content from about 0.5 to about 4.0% by weight, a cold water solubles content from about 40% to about 90% by weight, and a particle size such that at least 75% of the particles thereof are from about 250 microns to about 2000 microns.

12. The sorbent of claim 11 wherein the bulk density is in the range from about 600 kg/m$^3$ to about 850 kg/m$^3$, the reducing sugar content is in the range from about 0.75% to about 4.0%, and the cold water solubles content is from about 55% to about 85% by weight.

13. The sorbent of claim 11 or 12 additionally comprising from about 0.1% to about 5% by weight of a wettability increasing agent.

14. The sorbent of claim 13 wherein the wettability increasing agent is particulate and non-biodegradable.

15. The sorbent of claim 11 or 12 additionally comprising from about 0.1% to less than about 25% of a biodegradable particulate wettability increasing agent.

* * * * *